US011190342B2

(12) United States Patent
Qiu

(10) Patent No.: US 11,190,342 B2
(45) Date of Patent: *Nov. 30, 2021

(54) TRANSACTION PROCESSING IN A SERVICE BLOCKCHAIN

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/181,786

(22) Filed: Feb. 22, 2021

(65) Prior Publication Data

US 2021/0176045 A1 Jun. 10, 2021

Related U.S. Application Data

(63) Continuation of application No. 16/870,503, filed on May 8, 2020, now Pat. No. 10,931,440, which is a (Continued)

(30) Foreign Application Priority Data

Jul. 15, 2019 (CN) .......................... 201910635796.0

(51) Int. Cl.
*H04L 29/06* (2006.01)
*H04L 9/06* (2006.01)
(Continued)

(52) U.S. Cl.
CPC ........... *H04L 9/0637* (2013.01); *G06Q 20/06* (2013.01); *G06Q 20/382* (2013.01);
(Continued)

(58) Field of Classification Search
CPC ............... H04L 9/0637; H04L 2209/38; H04L 2209/56; H04L 9/0618; H04L 12/1804;
(Continued)

(56) References Cited

U.S. PATENT DOCUMENTS 10,298,585 B1 5/2019 Treat et al.
10,742,658 B2 * 8/2020 Lelcuk ................ H04L 63/0807
(Continued)

FOREIGN PATENT DOCUMENTS

CN 105488675 4/2016
CN 107995120 5/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Malcolm Cribbs
(74) *Attorney, Agent, or Firm* — Fish & Richardson P.C.

(57) ABSTRACT

Implementations of this specification provide a method and an apparatus for transaction processing in a service blockchain. An example method performed by a node device in the service blockchain includes receiving a target transaction, from a service system interlinked with the service blockchain; in response to receiving the target transaction, (i) triggering execution of a target service and (ii) determining a target asset blockchain corresponding to the target service from a plurality of asset blockchains interlinked with the service blockchain through a cross-chain relay; invoking, through the cross-chain relay, an asset exchange service deployed on the target asset blockchain, to complete asset exchange processing between transaction accounts related to the target transaction; obtaining, through the cross-chain
(Continued)

relay, an asset exchange credential between the transaction accounts related to the target transaction; and after obtaining the asset exchange credential, performing further transaction processing on the target service.

18 Claims, 9 Drawing Sheets

Related U.S. Application Data continuation of application No. 16/786,481, filed on Feb. 10, 2020, now Pat. No. 10,937,096, which is a continuation of application No. PCT/CN2020/072117, filed on Jan. 15, 2020.

(51) Int. Cl.
*G06Q 20/06* (2012.01)
*G06Q 20/38* (2012.01)
*G06Q 20/40* (2012.01)

(52) U.S. Cl.
CPC ....... *G06Q 20/401* (2013.01); *G06Q 2220/00* (2013.01); *H04L 2209/38* (2013.01); *H04L 2209/56* (2013.01)

(58) Field of Classification Search
CPC .... G06Q 20/06; G06Q 20/382; G06Q 20/401; G06Q 2220/00; G06Q 20/381; G06Q 40/04; G06F 21/62; G06F 21/6236
See application file for complete search history.

(56) References Cited

U.S. PATENT DOCUMENTS

| | | | |
|---|---|---|---|
| 2017/0046698 A1 | 2/2017 | Haldenby et al. | |
| 2017/0154331 A1 | 6/2017 | Voorhees | |
| 2017/0206523 A1 | 7/2017 | Goeringer et al. | |
| 2018/0091316 A1 | 3/2018 | Stradling et al. | |
| 2018/0108089 A1* | 4/2018 | Jayachandran | G06Q 30/0282 |
| 2018/0294967 A1 | 10/2018 | Roberts et al. | |
| 2019/0043048 A1 | 2/2019 | Wright et al. | |
| 2019/0052454 A1 | 2/2019 | Wright et al. | |
| 2019/0057382 A1 | 2/2019 | Wright et al. | |
| 2019/0058581 A1 | 2/2019 | Wood et al. | |
| 2019/0081793 A1 | 3/2019 | Martino et al. | |
| 2019/0095880 A1 | 3/2019 | Glover et al. | |
| 2019/0114706 A1 | 4/2019 | Bell et al. | |
| 2019/0172026 A1 | 6/2019 | Vessenes et al. | |
| 2019/0188701 A1 | 6/2019 | Parsons et al. | |
| 2019/0251080 A1 | 8/2019 | Lu et al. | |
| 2019/0251199 A1 | 8/2019 | Klianev et al. | |
| 2019/0253263 A1 | 8/2019 | Qiu | |
| 2019/0279206 A1 | 9/2019 | Song et al. | |
| 2019/0305958 A1 | 10/2019 | Qiu | |
| 2019/0311351 A1 | 10/2019 | Zhang et al. | |
| 2019/0340266 A1 | 11/2019 | Vo et al. | |
| 2019/0340267 A1 | 11/2019 | Vo et al. | |
| 2019/0370792 A1 | 12/2019 | Lam | |
| 2020/0004788 A1 | 1/2020 | Qiu | |
| 2020/0034457 A1* | 1/2020 | Brody | H04L 9/0819 |
| 2020/0074461 A1 | 3/2020 | DeRosa-Grund | |
| 2020/0134656 A1 | 4/2020 | Padmanabhan | |
| 2020/0151270 A1* | 5/2020 | Fox | G06F 16/2455 |
| 2020/0167773 A1* | 5/2020 | Cervenka | G06F 16/27 |
| 2020/0274695 A1 | 8/2020 | Qiu | |
| 2020/0278958 A1* | 9/2020 | Zhang | G06Q 20/3678 |

FOREIGN PATENT DOCUMENTS

| | | |
|---|---|---|
| CN | 108256864 | 7/2018 |
| CN | 108492105 | 9/2018 |
| CN | 108647958 | 10/2018 |
| CN | 109493009 | 3/2019 |
| CN | 109636395 | 4/2019 |
| CN | 109670749 | 4/2019 |
| CN | 109685486 | 4/2019 |
| CN | 109785136 | 5/2019 |
| CN | 109949194 | 6/2019 |
| CN | 110471984 | 11/2019 |
| GN | 107977811 | 5/2018 |
| TW | 201837805 | 10/2018 |
| TW | 201840159 | 11/2018 |

OTHER PUBLICATIONS

Nakamoto, "Bitcoin: A Peer-to-Peer Electronic Cash System," www.bitcoin.org, 2005, 9 pages.

Qiuming et al., "A Review of Foreign Research of Blockchain Technology", Science & Technology Progress and Policy, Jan. 2018, vol. 35 No. 2, 7 pages (with English abstract).

Raikwar et al., "A Blockchain Framework for Insurance Processes", 9th IFIP International Conference on New Technologies, Mobility and Security, Feb. 2018, 4 pages.

PCT International Search Report and Written Opinion in International Application No. PCT/CN2020/072117, dated Apr. 13, 2020, 10 pages (with partial English translation).

\* cited by examiner

TRANSACTION PROCESSING IN A SERVICE BLOCKCHAIN

CROSS-REFERENCE TO RELATED APPLICATIONS

This application is a continuation of U.S. patent application Ser. No. 16/870,503, filed on May 8, 2020, which is a continuation of U.S. patent application Ser. No. 16/786,481, filed on Feb. 10, 2020, which is a continuation of PCT Application No. PCT/CN2020/072117, filed on Jan. 15, 2020, which claims priority to Chinese Patent Application No. 201910635796.0, filed on Jul. 15, 2019, and each application is hereby incorporated by reference in its entirety.

TECHNICAL FIELD

One or more embodiments of the present disclosure relate to the technical field of blockchain, and more particularly, to a blockchain-based service processing method and apparatus, and an electronic device.

BACKGROUND

Blockchain technology, also known as distributed ledger technology, is an emerging technology in which several computing devices participate in "record-keeping" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present disclosure proposes a blockchain-based service processing method, which can be applied to a service blockchain in a cross-chain service system. The cross-chain service system includes a service blockchain, and a plurality of asset blockchains interlinked with the service blockchain through a cross-chain relay. An asset exchange service is deployed on the asset blockchain. One example of the method includes: receiving a target transaction sent by a service system interlinked with the service blockchain, wherein the target transaction is used to trigger execution of a target service; in response to the target transaction, determining a target asset blockchain corresponding to the target service from the plurality of asset blockchains, invoking through the cross-chain relay, an asset exchange service deployed on the target asset blockchain, to complete asset exchange processing between service accounts related to the target transaction, and obtaining through the cross-chain relay, an asset exchange credential between the service accounts related to the target transaction which is stored on the target asset blockchain; and in response to the obtained asset exchange credential, performing further service processing on the target service.

In some embodiments, in response to the target transaction, determining a target asset blockchain corresponding to the target service from the plurality of asset blockchains; invoking through the cross-chain relay, an asset exchange service deployed on the target asset blockchain, to complete asset exchange processing between service accounts related to the target transaction; and obtaining through the cross-chain relay, an asset exchange credential between the service accounts related to the target transaction which is stored on the target asset blockchain includes: in response to the target transaction, invoking a cross-chain processing logic in a first smart contract deployed on the service blockchain, determining a target asset blockchain corresponding to the target service from the plurality of asset blockchains, invoking through the cross-chain relay, an asset exchange service deployed on the target asset blockchain, to complete asset exchange processing between service accounts related to the target transaction, and obtaining through the cross-chain relay, an asset exchange credential between the service accounts related to the target transaction which is stored on the target asset blockchain.

In some embodiments, invoking through the cross-chain relay, an asset exchange service deployed on the target asset blockchain, to complete asset exchange processing between service accounts related to the target transaction, and obtaining through the cross-chain relay, an asset exchange credential between the service accounts related to the target transaction which is stored on the target asset blockchain includes: invoking through the cross-chain relay, an asset exchange service logic in a second smart contract deployed on the target asset blockchain, to complete asset exchange processing between service accounts related to the target transaction, and obtaining through the cross-chain relay, the asset exchange credential posted by the second smart contract to the target asset blockchain for storage after the asset exchange processing is completed.

In some embodiments, in response to the obtained asset exchange credential, performing further service processing on the target service includes: in response to the obtained asset exchange credential, further invoking a service processing logic in the first smart contract to perform further service processing on the target service, and posting a service processing result to the service blockchain for storage.

In some embodiments, in response to the obtained asset exchange credential, performing further service processing on the target service includes: in response to the obtained asset exchange credential, posting the asset exchange credential to the service blockchain for storage, so that upon monitoring the asset exchange credential, the service system performs further service processing on the target service, and posts a service processing result to the service blockchain for storage.

In some embodiments, the service blockchain is interlinked with an asset service chain through a cross-chain relay. And the asset service chain is further interlinked with the plurality of asset blockchains through the cross-chain relay respectively. Or, the asset service chain is further interlinked with a server of an asset service institution through an Oracle machine.

In some embodiments, the service blockchain is interlinked with a server of an asset service institution through an Oracle machine. And the server of the asset service institution deploys an asset exchange service.

The present disclosure proposes a blockchain-based service processing method, applied to a service blockchain in a cross-chain service system. The cross-chain service system includes a service blockchain, and servers of a plurality of asset service institutions which are interlinked with the service blockchain through an Oracle machine. An asset exchange service is deployed on the server. One example of the method includes: receiving a target transaction sent by a service system interlinked with the service blockchain, wherein the target transaction is used to trigger execution of a target service; in response to the target transaction, determining a target asset-service-institution server corresponding to the target service from the plurality of asset-service-institution servers, invoking through the Oracle machine, an asset exchange service deployed on the target asset-service-institution server, to complete asset exchange processing between service accounts related to the target transaction, and obtaining through the Oracle machine, an asset exchange credential between the service accounts related to the target transaction; and in response to the obtained asset exchange credential, performing further service processing on the target service.

In some embodiments, in response to the target transaction, determining a target asset-service-institution server corresponding to the target service from the plurality of asset-service-institution servers, invoking through the Oracle machine, an asset exchange service deployed on the target asset-service-institution server, to complete asset exchange processing between service accounts related to the target transaction, includes: in response to the target transaction, invoking a cross-chain processing logic in a third smart contract deployed on the service blockchain, determining a target asset-service-institution server corresponding to the target service from the plurality of asset-service-institution servers, and invoking through the Oracle machine, an asset exchange service deployed on the target asset-service-institution server, to complete asset exchange processing between service accounts related to the target transaction.

In some embodiments, in response to the obtained asset exchange credential, performing further service processing on the target service includes: in response to the obtained asset exchange credential, further invoke a service processing logic in the third smart contract to perform further service processing on the target service, and post a service processing result to the service blockchain for storage.

In some embodiments, in response to the obtained asset exchange credential, performing further service processing on the target service includes: in response to the obtained asset exchange credential, posting the asset exchange credential to the service blockchain for storage, so that upon monitoring the asset exchange credential, the service system performs further service processing on the target service, and posts a service processing result to the service blockchain for storage.

In some embodiments, the service blockchain is interlinked with an asset service chain through a cross-chain relay. And the asset service chain is further interlinked with the servers of the plurality of asset service institutions respectively through the Oracle machine.

The present disclosure proposes a blockchain-based service processing apparatus, applied to a service blockchain in a cross-chain service system. The cross-chain service system includes a service blockchain, and a plurality of asset blockchains interlinked with the service blockchain through a cross-chain relay. An asset exchange service is deployed on the asset blockchain. An example of the apparatus includes: a first receiving module configured to receive a target transaction sent by a service system interlinked with the service blockchain, where the target transaction is used to trigger execution of a target service; a first invoking module configured to, in response to the target transaction, determine a target asset blockchain corresponding to the target service from the plurality of asset blockchains, invoke through the cross-chain relay, an asset exchange service deployed on the target asset blockchain, to complete asset exchange processing between service accounts related to the target transaction, and obtain through the cross-chain relay, an asset exchange credential between the service accounts related to the target transaction which is stored on the target asset blockchain; and a first processing module configured to, in response to the obtained asset exchange credential, perform further service processing on the target service.

In some embodiments, the first invoking module is further configured to: in response to the target transaction, invoke a cross-chain processing logic in a first smart contract deployed on the service blockchain, determine a target asset blockchain corresponding to the target service from the plurality of asset blockchains, invoke through the cross-chain relay, an asset exchange service deployed on the target asset blockchain, to complete asset exchange processing between service accounts related to the target transaction, and obtain through the cross-chain relay, an asset exchange credential between the service accounts related to the target transaction which is stored on the target asset blockchain.

In some embodiments, the first invoking module is further configured to: invoke through the cross-chain relay, an asset exchange service logic in a second smart contract deployed on the target asset blockchain, to complete asset exchange processing between service accounts related to the target transaction, and obtain through the cross-chain relay, the asset exchange credential posted by the second smart contract to the target asset blockchain for storage after the asset exchange processing is completed.

In some embodiments, the first processing module is further configured to: in response to the obtained asset exchange credential, further invoke a service processing logic in the first smart contract to perform further service processing on the target service, and post a service processing result to the service blockchain for storage.

In some embodiments, the first processing module is further configured to: in response to the obtained asset exchange credential, post the asset exchange credential to the service blockchain for storage, so that upon monitoring the asset exchange credential, the service system performs further service processing on the target service, and posts a service processing result to the service blockchain for storage.

In some embodiments, the service blockchain is interlinked with an asset service chain through the cross-chain relay. And the asset service chain is further interlinked with the plurality of asset blockchains through the cross-chain relay respectively. Or, the asset service chain is further interlinked with a server of an asset service institution through an Oracle machine.

In some embodiments, the service blockchain is interlinked with a server of an asset service institution through an Oracle machine. The server of the asset service institution deploys an asset exchange service.

The present disclosure proposes a blockchain-based service processing apparatus, which can be applied to a service blockchain in a cross-chain service system. The cross-chain service system includes a service blockchain, and servers of a plurality of asset service institutions which are interlinked with the service blockchain through an Oracle machine. An asset exchange service is deployed on the server. One example of the apparatus includes: a second receiving module configured to receive a target transaction sent by a service system interlinked with the service blockchain, where the target transaction is used to trigger execution of a target service; a second invoking module configured to, in response to the target transaction, determine a target asset-service-institution server corresponding to the target service from the plurality of asset-service-institution servers, invoke through the Oracle machine, an asset exchange service deployed on the target asset-service-institution server, to complete asset exchange processing between service accounts related to the target transaction, and obtain through the Oracle machine, an asset exchange credential between the service accounts related to the target transaction; and a second processing module configured to, in response to the obtained asset exchange credential, perform further service processing on the target service.

In some embodiments, the second invoking module is further configured to: in response to the target transaction, invoke a cross-chain processing logic in a third smart contract deployed on the service blockchain, determine a target asset-service-institution server corresponding to the target service from the plurality of asset-service-institution servers, and invoke through the Oracle machine, an asset exchange service deployed on the target asset-service-institution server, to complete asset exchange processing between service accounts related to the target transaction.

In some embodiments, the second invoking module is further configured to: in response to the obtained asset exchange credential, further invoke a service processing logic in the third smart contract to perform further service processing on the target service, and post a service processing result to the service blockchain for storage.

In some embodiments, the second processing module is further configured to: in response to the obtained asset exchange credential, post the asset exchange credential to the service blockchain for storage, so that upon monitoring the asset exchange credential, the service system performs further service processing on the target service, and posts a service processing result to the service blockchain for storage.

In some embodiments, the service blockchain is interlinked with an asset service chain through a cross-chain relay. And the asset service chain is further interlinked with the servers of the plurality of asset service institutions respectively through the Oracle machine.

In the above technical solution, the service blockchain can be interlinked with a plurality of asset blockchains through a cross-chain relay, so that when a service system interlinked with the service blockchain executes a target service which needs an asset exchange service deployed on a target asset blockchain as service support, an asset exchange credential between service accounts related to the target transaction which is stored on the target asset blockchain can be obtained through the cross-chain relay. Then, based on the obtained asset exchange credential, service processing can be further performed on the target service. The service blockchain may not need the relevant asset exchange service separately deployed as service support for the target service. It is possible to integrate assets exchange services deployed on the plurality of asset blockchains, to enable the service blockchain to have a variety of asset exchange capabilities, so the construction cost of the service blockchain can be reduced and the service processing process on the service blockchain can be simplified.

In the above technical solution, the service blockchain can also be interlinked with a plurality of servers of asset service institutions through an Oracle machine. As such, when a service system interlinked with the service blockchain executes a target service which needs an asset exchange service deployed on a target asset-service-institution server as service support, an asset exchange service deployed on the target asset-service-institution server can be invoked through the Oracle machine, to execute the asset exchange processing between the service accounts related to the target transaction. The asset exchange credential between the service accounts related to the target transaction can be obtained through the Oracle machine. Then, based on the obtained asset exchange credential, service processing can be further performed on the target service. The service blockchain may not need the relevant asset exchange service separately deployed as service support for the target service. It is possible to integrate assets exchange services deployed on the plurality of servers of asset service institutions, to enable the service blockchain to have a variety of asset exchange capabilities, so the construction cost of the service blockchain can be reduced and the service processing process on the service blockchain can be simplified.

DETAILED DESCRIPTION OF THE EXAMPLES

Figure 1:
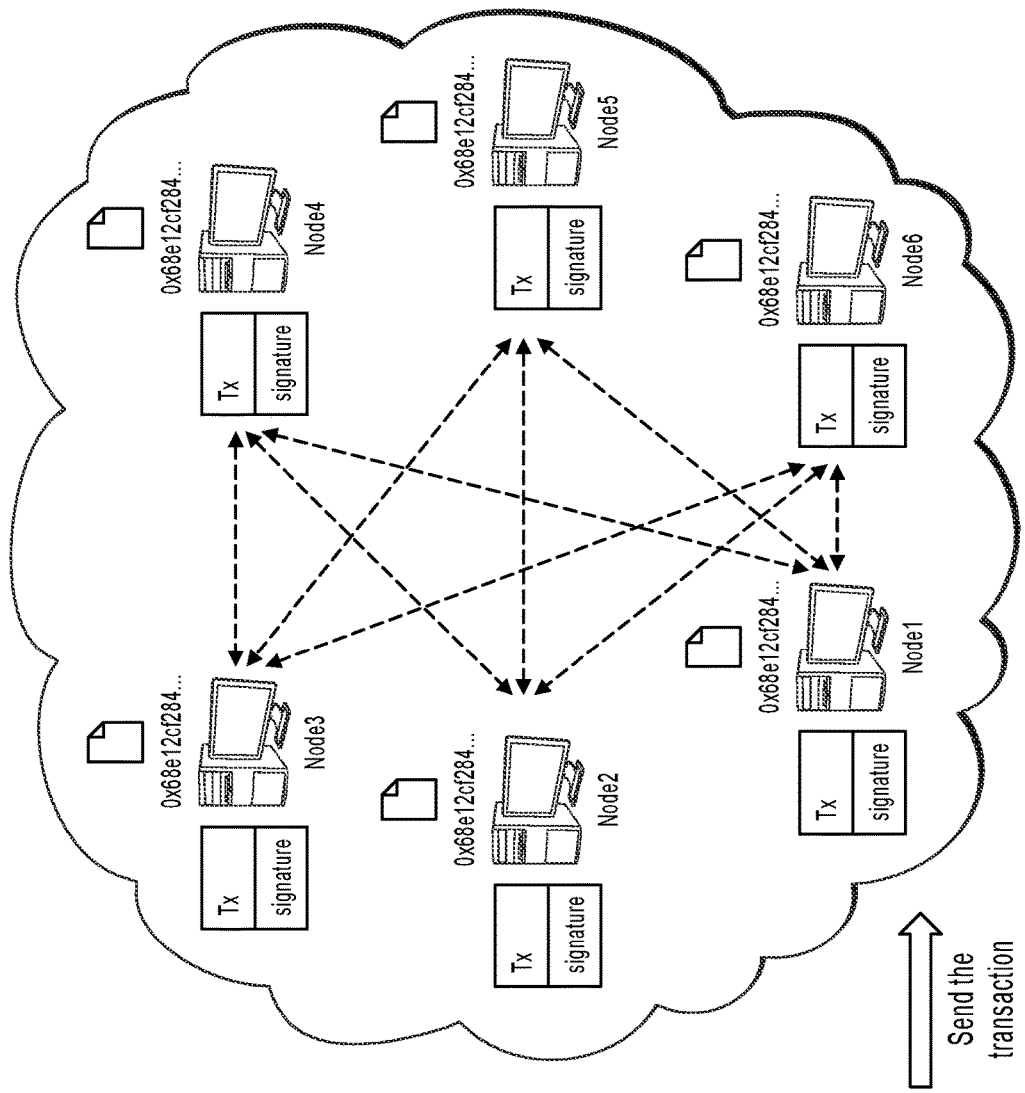
FIG. 1 is a schematic diagram of creating a smart contract according to an embodiment of the present disclosure.
Figure 1:
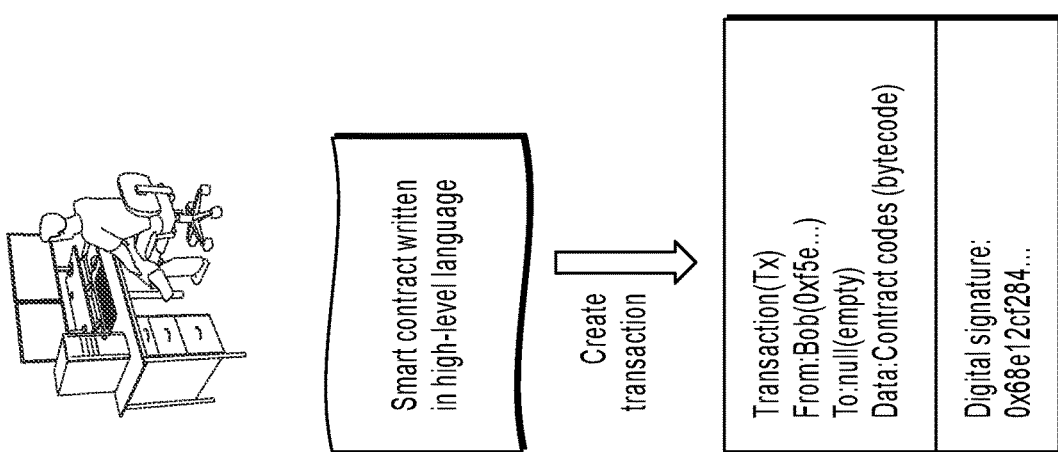

Some embodiments will be described in detail here, examples of which are illustrated in the accompanying drawings. When the following description refers to the accompanying drawings, the same numerals in different drawings represent the same or similar elements unless otherwise indicated. The implementations described in the following embodiments do not represent all implementations consistent with one or more embodiments of the present disclosure. Rather, they are merely examples of apparatuses and methods consistent with some aspects of one or more embodiments of the present disclosure, as detailed in the appended claims.

It should be noted that, in some embodiments, the steps of the corresponding method may not be performed in the order shown and described in the present disclosure. In some embodiments, the method may include more or fewer steps than described in the present disclosure. In some embodiments, a single step described in the present disclosure may be divided into multiple steps for description. In some embodiments, multiple steps described in the present disclosure may be combined into a single step.

Blockchains are generally divided into three types: public blockchains, private blockchains, and consortium blockchains. In addition, there can be combinations of the above types, such as private blockchain+consortium blockchain, consortium blockchain+public blockchain, etc.

Here, the most decentralized is the public blockchain. The public blockchain is represented by Bitcoin and Ethereum. Participants (also known as nodes in the blockchain) joining the public blockchain can read data records on the chain, participate in transactions, and compete for the record-keeping right for latest blocks. Moreover, each node can freely join or leave the network and perform related operations.

On the contrary, for the private blockchain, the write permission of the network is controlled by an organization or institution, and the data read permission is regulated by the organization. In simple terms, a private blockchain can be a weakly centralized system with strict restrictions on nodes and having a small number of nodes. This type of blockchain is more suitable for internal use by specific institutions.

The consortium blockchain is a blockchain between the public blockchains and the private blockchains, which can achieve "partial decentralization". Each node in the consortium blockchain usually has a corresponding entity or organization; nodes are authorized to join the network and form a stakeholder alliance to jointly maintain the operation of the blockchain.

Based on the basic characteristics of a blockchain, a blockchain is usually composed of several blocks. In each of these blocks, a timestamp corresponding to the creation time of the block is recorded, and all of the blocks form a time-ordered data chain strictly according to the timestamps recorded in the blocks.

The real data generated by the physical world can be constructed into a standard transaction format supported by the blockchain, and then post to the blockchain, and the node devices in the blockchain will perform consensus processing on the received transactions. After reaching a consensus, the transaction will be packaged into a block by the node device that acts as a record-keeping node in the blockchain, and will be stored as a persistent credential the blockchain.

Here, the consensus algorithms supported in the blockchain can include the following types:

a first type of consensus algorithm, that is, a consensus algorithm in which the node devices have to compete for the record-keeping right of each round of record-keeping cycle. For example, the first type of consensus algorithm includes consensus algorithms such as Proof of Work (POW), Proof of Stake (POS), appointment Consensus algorithms such as Delegated Proof of Stake (DPOS); and a second type of consensus algorithm, that is, a consensus algorithm that a record-keeping node is elected in advance for each round of record-keeping cycle (without the need to compete for the record-keeping right). For example, the second type of consensus algorithm includes consensus algorithms such as Practical Byzantine Fault Tolerance (PBFT).

In a blockchain network employing the first type of consensus algorithm, node devices that compete for the record-keeping right can execute a transaction upon receiving the transaction. One of the node devices competing for the record-keeping right may win in the current round of contention for the record-keeping right and become the record-keeping node. The record-keeping node can package the received transaction with other transactions to generate the latest block, and send the generated latest block or the block header of the latest block to other node devices for consensus.

In the blockchain network employing the second type of consensus algorithm, the node device having the record-keeping right has been agreed before the current round of record-keeping. Therefore, upon receiving a transaction, a node device, if the node device is not the record-keeping node of the current round, can send the transaction to the record-keeping node. The record-keeping node of the current round can execute the transaction during or before the transaction is packaged with other transactions to generate the latest block. After the record-keeping node generates the latest block, the record-keeping node can send the latest block or the block header of the latest block to other node devices for consensus.

As mentioned above, no matter which consensus algorithm is adopted by the blockchain, the record-keeping node of the current round can package the received transaction to generate the latest block, and the generated latest block or the block header of the latest block is sent to other node devices for consensus verification. If other node devices receive the latest block or the block header of the latest block, and it is verified that there is no problem, the latest block can be added to the end of the original blockchain to complete the record-keeping process of the blockchain. The other nodes can also execute the transaction contained in the block during the process of verifying the latest block or block header sent by the record-keeping node.

In the field of blockchain, there is a concept: account. Taking Ethereum as an example, accounts are divided into two types: external accounts and contract accounts. An external account is an account directly controlled by a user, also referred to as a user account. A contract account is an account containing contract codes (that is, smart contracts) which is created by a user through an external account.

However, for some blockchain projects (such as Ant Blockchain) derived from the Ethereum-based architecture, the account types supported by the blockchain can be further expanded, which is not specifically limited in this description.

For an account in the blockchain, a structure is usually used to maintain the account state of the account. When a transaction in a block is executed, the state of the account associated with the transaction in the blockchain usually also changes.

Taking Ethereum as an example, the structure of an account usually includes fields such as Balance, Nonce, Code, and Storage.

The Balance field is configured to maintain the current account balance of the account.

The Nonce field is configured to maintain the number of transactions for this account, and is a counter used to ensure that each transaction can be processed only once, thereby effectively avoiding replay attacks.

The Code field is configured to maintain the contract codes of the account. In an implementation, the Code field usually only maintains the hash value of the contract codes. Therefore, the Code field is also commonly called the Codehash field.

The Storage field is configured to maintain the storage content of the account (the field value is null by default). In an implementation, for a contract account, an independent storage space is usually allocated to store the storage content of the contract account. The independent storage space is usually referred to as the account storage of the contract account. The storage content of the contract account is usually constructed as a data structure of an MPT (Merkle Patricia Trie) tree and stored in the above independent storage space. Here, the MPT tree constructed based on the storage content of the contract account is also commonly referred to as a Storage tree. The Storage field usually only maintains the root node of the Storage tree. Therefore, the Storage field is also commonly called the StorageRoot field. For external accounts, the field values of the Code field and the Storage field are both null values.

In the field of blockchain, whether it is a public, private or consortium chain, it is possible to provide the function of a smart contract. A smart contract on the blockchain is a contract that can be triggered by transactions on the blockchain. Smart contracts can be defined in the form of code.

Taking Ethereum as an example, Ethereum supports users to create and invoke some complex logic in the Ethereum network. Ethereum is a programmable blockchain, and its core is the Ethereum Virtual Machine (EVM). Each Ethereum node can run EVM. EVM is a Turing-complete virtual machine, through which a variety of complex logic can be implemented. Users issuing and invoking smart contracts in Ethereum are run on EVM. In fact, EVM directly runs virtual machine code (virtual machine bytecode, hereinafter referred to as "bytecode"), so smart contracts deployed on the blockchain can be bytecode.

As shown in FIG. 1, after Bob sends a transaction containing the information about creating a smart contract to the Ethereum network, each node can execute the transaction in the EVM. Here, the From field of the transaction in FIG. 1 is used to record the address of the account that initiated the creation of the smart contract. The field value of the Data field of the transaction can be byte code, and the field value of the To field of the transaction is a null (empty) account. When a consensus is reached between the nodes through a consensus mechanism, this smart contract is successfully created, and subsequent users can invoke this smart contract.

After the smart contract is created, a contract account corresponding to the smart contract appears on the blockchain and has a specific address. For example, "0x68e12cf284 . . . " in each node in FIG. 1 represents the address of the contract account created. Contract code (Code) and account storage (Storage) will be stored in the account storage of the contract account. The behavior of the smart contract is controlled by the contract code, and the smart contract account storage saves the state of the smart contract. In other words, smart contracts enable virtual accounts containing contract codes and account storage to be generated on the blockchain.

As mentioned earlier, the Data field of the transaction containing creation of a smart contract can store the bytecode of the smart contract. A Bytecode consists of a series of bytes, and each of the bytes can determine an operation. Based on multiple considerations such as development efficiency and readability, developers can choose not to write bytecodes directly, but choose a high-level language to write smart contract codes. For example, the high-level language may be such as Solidity, Serpent, LLL language, and the like. Smart contract codes written in a high-level language can be compiled by a compiler to generate bytecodes that can be deployed on the blockchain.

Taking the Solidity language as an example, the contract codes written in Solidity is very similar to the classes in the object-oriented programming language. In a contract, multiple members can be declared, including state variables, functions, function modifiers, events, and so on. A state variable is a value that is permanently stored in the Account Storage field of the smart contract and is used to save the state of the contract.

Figure 2:
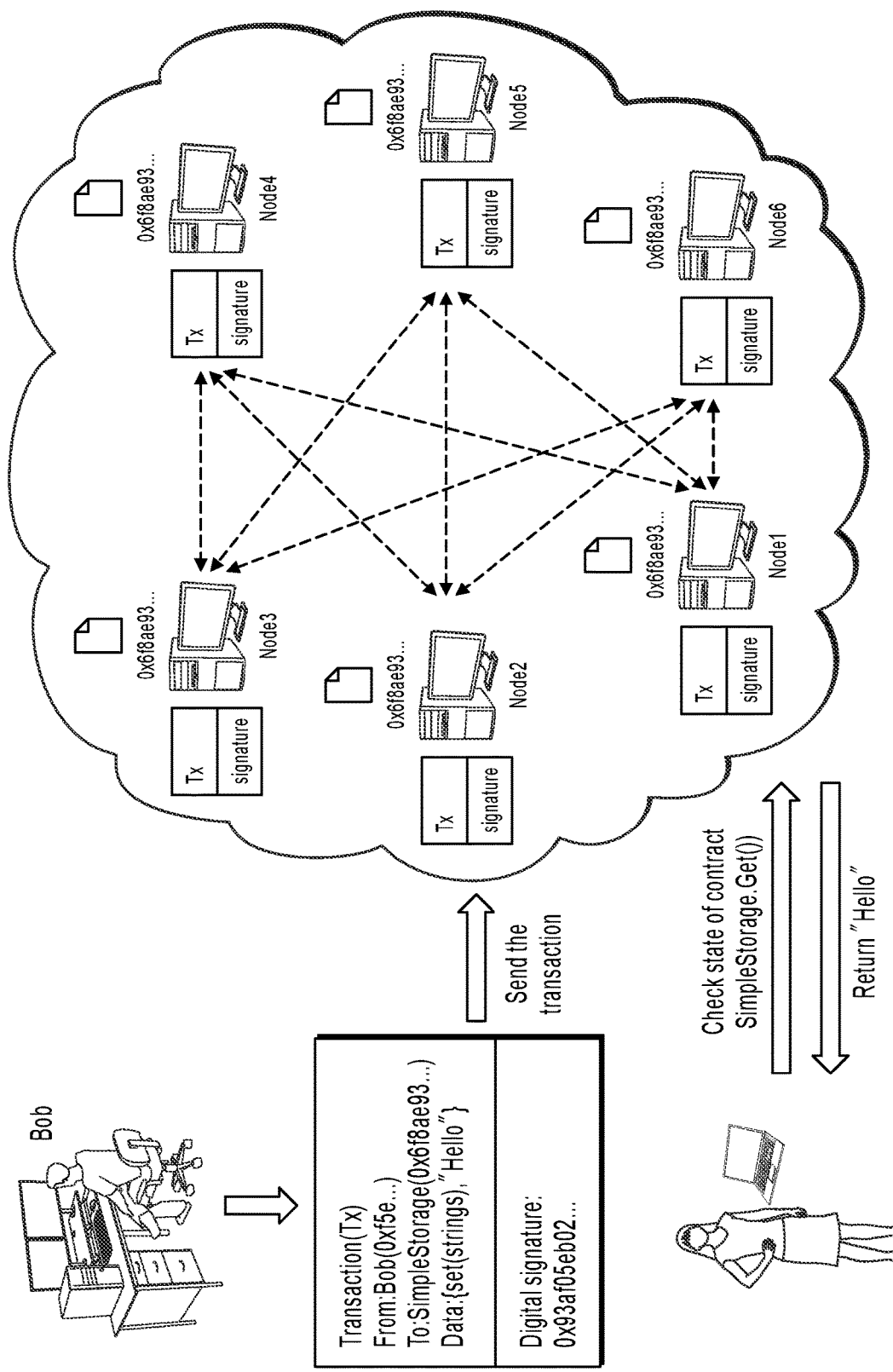
FIG. 2 is a schematic diagram of invoking a smart contract according to an embodiment of the present disclosure.

As shown in FIG. 2, still taking Ethereum as an example, after Bob sends a transaction containing information about invoking smart contracts to the Ethereum network, each node can execute the transaction in EVM and run the relevant contract codes of the smart contract in EVM. Here, the From field of the transaction in FIG. 2 is used to record the address of the account that initiated the invoking of the smart contract, the To field is used to record the address of the invoked smart contract, and the Data field of the transaction is used to record the method and parameters of the invoking smart contract. After invoking the smart contract, the account state of the contract account may change. Subsequently, a client can check the account state of the contract account through the connected blockchain node (such as node 1 in FIG. 2).

The smart contract can be independently executed by each node in the blockchain network in a prescribed manner, and all execution records and data are stored on the blockchain, so after such transaction is completed, transaction credentials that cannot be tampered with and will not be lost are stored on the blockchain.

Figure 3:
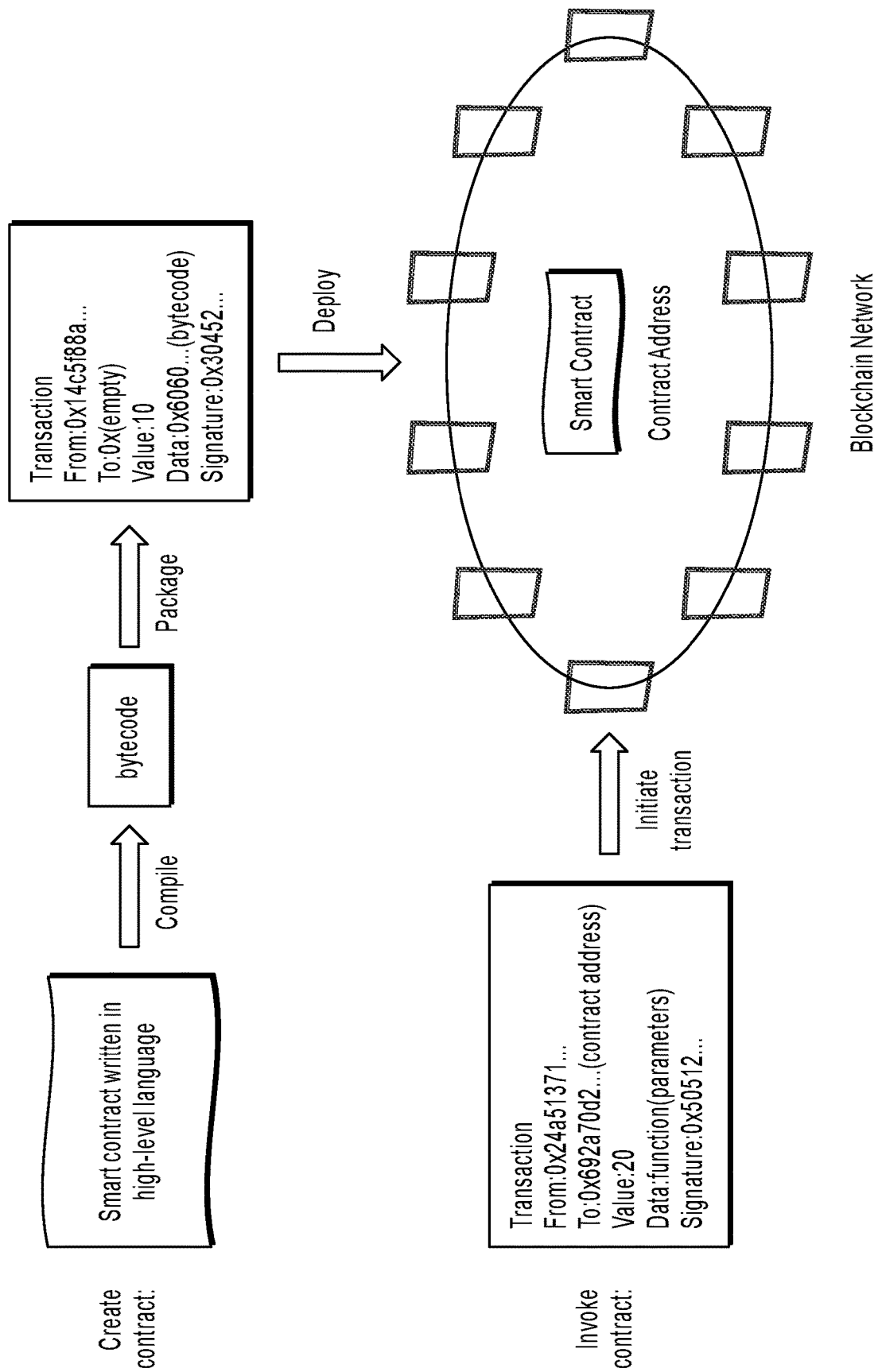
FIG. 3 is a schematic diagram of creating a smart contract and invoking a smart contract according to an embodiment of the present disclosure.

The diagram of creating a smart contract and invoking a smart contract is shown in FIG. 3. To create a smart contract in Ethereum, it can go through the processes of writing a smart contract, turning the smart contract into bytecodes, and deploying the bytecodes to the blockchain. Invoking a smart contract in Ethereum is to initiate a transaction that points to the address of the smart contract. The EVM of each node can execute the transaction separately, and the smart contract codes are distributed to run in the virtual machine of each node in the Ethereum network.

The traditional blockchain projects are represented by Ethereum. In order to achieve "value transfer" on the blockchain, Ethereum usually supports the conversion of real-world currencies into virtual tokens that can be circulated on the chain.

In the field of blockchain, some blockchain projects derived from the Ethereum-based architecture (such as the Ant Blockchain) may not support converting real-world currencies into virtual tokens that can be circulated on the chain. Instead, in these blockchain projects, some non-monetary physical assets in the real world can be converted into virtual assets that can be circulated on the blockchain.

Here, it should be noted that converting non-monetary physical assets in the real world into virtual assets on the blockchain usually means a process of anchoring the physical assets with the virtual assets on the blockchain as the value support for these virtual assets, and then generating virtual assets on the blockchain that matches the value of physical assets and that can be circulated between blockchain accounts on the blockchain.

In an implementation, the types of accounts supported by the blockchain can be expanded. On the basis of the types of accounts supported by the blockchain, an asset account (also known as an asset object) can be added. For example, it is possible to further expand an asset account on the basis of external accounts and contract accounts supported in Ethereum. The added asset account is the virtual assets on the blockchain that is the value support for the non-monetary physical assets in the real world and that can be circulated between blockchain accounts on the blockchain.

For users accessing this type of blockchain, in addition to completing the creation of user accounts and smart contracts on the blockchain, users can also create virtual assets matching the value of non-monetary physical assets in the real world and which can be circulated between blockchain accounts on the blockchain. For example, users can convert non-monetary physical assets such as real estate, stocks, loan contracts, bills, receivables into virtual assets with matching value that are circulated on the blockchain.

Here, the asset account can also be a structure used to maintain the account state of the account. The content of the asset account structure can be the same as that of Ethereum, and of course, the content of the asset account structure can also be designed based on actual needs.

In one implementation, taking the content of the structure of the asset account as the same as that of Ethereum as an example, the structure of the asset account may also include the fields of Balance, Nonce, Code, and Storage described above.

It should be noted that in Ethereum, the Balance field is usually used to maintain the current account balance of the account. For blockchain projects derived from the Ethereum-based architecture, since those blockchain projects may not support converting the real world currencies into virtual tokens that can be circulated on the chain, in this type of blockchain, the meaning of the Balance field can be expanded to not represent the "balance" of the account, but to maintain the address information of the asset account corresponding to the "virtual asset" held by the account. In an implementation, the Balance field can maintain address information of asset accounts corresponding to multiple pieces of "virtual assets".

In this case, all of the external account, contract account, and asset account shown above can add address information of the asset account corresponding to a to-be-held "virtual asset" in the Balance field, so as to hold the virtual asset. That is, in addition to external account and contract account, the asset account itself can also hold virtual assets.

For asset accounts, the field values of the Nonce and the Code fields can be null (or not null). The field value of the Storage field can be not null. The Storage field can be used to maintain the corresponding asset state of the "virtual asset" corresponding to the asset account. The specific manner of maintaining the asset state of the "virtual asset" corresponding to the asset account in the Storage field can be flexibly designed based on demand, which will not be elaborated herein.

In a blockchain project derived from the Ethereum-based architecture, users can create virtual assets on the blockchain that match the value of real-world non-monetary physical assets through the implementations shown below.

In one implementation, the types of transactions supported by the blockchain can be expanded to include a type of transaction used to create virtual assets. For example, the types of transactions supported by Ethereum usually include a transaction of ordinary transfer, a transaction for creating a smart contract, a transaction for invoking a smart contract, and based on the three types of transactions, a transaction of creating virtual assets can be added.

In this case, the user can post a transaction for creating virtual assets to the blockchain network through the client, and the node device in the blockchain executes the transaction in the local EVM to create virtual assets for the user. After each node device reached a consensus through the consensus mechanism, the virtual assets are successfully created, and an asset account corresponding to the virtual assets appears on the blockchain and has a specific address.

In an implementation, a smart contract for creating virtual assets may also be deployed on the blockchain. The process of deploying a smart contract for creating virtual assets will not be repeated herein.

In this case, the user can post a transaction for invoking the smart contract to the blockchain network through the client. The node device in the blockchain executes the transaction in the local EVM, and run the contract codes related to the smart contract in the EVM to create virtual assets for the user. After each node device reached a consensus through the consensus mechanism, the virtual assets are successfully created, and an asset account corresponding to the virtual assets appears on the blockchain and has a specific address.

However, for some blockchain projects derived from the Ethereum-based architecture, if those blockchain projects also support the function of converting real-world currencies into virtual tokens that can be circulated on the chain, then some real-world non-monetary physical assets can still be transformed into virtual tokens that can be circulated on the blockchain and put into circulation on the blockchain, which will not be described in the present disclosure.

With the continuous enrichment of the service scenarios of the blockchain, in addition to the services that are closely related to value transfer such as account transfers, increasingly more blockchain projects have begun to introduce some traditional service scenarios that have nothing to do with value transfer. For example, a service system can be interlinked with a service blockchain to complete traditional service scenarios such as renting service, real estate trading on the service blockchain.

In these traditional service scenarios, there is a type of service scenario that may require an asset exchange service deployed by an asset service institution as service support.

Here, the so-called an asset exchange service deployed by an asset service institution as service support means that when the service system completes the corresponding service implementation on the interlinked service blockchain, based on the asset exchange service by the asset service institution, asset exchange between service-related service accounts needs to be completed first. After the asset exchange has been completed and the relevant asset exchange credentials are stored on the service blockchain, further service processing can be completed on the service blockchain.

For example, taking the service being a real estate trading service as an example, the service accounts related to this service can refer to the buyer's property account and the seller's property account, and the asset service institution can refer to a real estate service institution (such as a real estate trading center). The asset exchange service can refer to the "real estate ownership transfer" service. In this service scenario, if real estate trading service needs to be implemented on the service blockchain, the buyer and the seller may firstly complete the "real estate ownership transfer" between the buyer's property account and the seller's property account, based on the "real estate ownership transfer" service provided by the real estate service organization. After the "real estate ownership transfer" has been completed, and the relevant "real estate ownership transfer" credentials (i.e. the asset exchange credentials) are stored on the service blockchain, subsequent service processing of the real estate trading service can be further completed based on the "real estate ownership transfer" credentials stored on the service blockchain.

In these traditional service scenarios, since the asset exchange service of the asset service institution needs to be used as a service support, the asset exchange service of the asset service institution may be deployed on the service blockchain.

In some embodiments of the present disclosure, a technical solution is proposed to enable the service blockchain to have a variety of asset exchange capabilities by integrating asset exchange services of multiple asset service institutions, without separately deploying assert exchange service as service support to the service blockchain.

In an implementation, a cross-chain interaction system consisting of at least a service blockchain and a plurality of asset blockchains can be built. The service blockchain is interlinked with the plurality of asset blockchains through a cross-chain relay. Asset exchange services can be deployed on each asset blockchain.

A service system interlinked with the service blockchain can post a target transaction to the service blockchain to trigger execution of a target service. The target service can be the service described above that requires the asset exchange service as a service support.

Upon receiving the target transaction, a node device in the service blockchain can, in response to the target transaction, determine a target asset blockchain corresponding to the target service from the plurality of asset blockchains, and obtain, through the cross-chain relay, an asset exchange credential between service accounts related to the target transaction which is stored on the target asset blockchain.

After the asset exchange credential is obtained, the node device in the service blockchain can perform further service processing on the target service.

In the above technical solution, the service blockchain can be interlinked with a plurality of asset blockchains through a cross-chain relay. As such when a service system interlinked with the service blockchain executes a target service which needs an asset exchange service deployed on a target asset blockchain as service support, an asset exchange credential between service accounts related to the target transaction which is stored on the target asset blockchain can be obtained through the cross-chain relay. Then, based on the obtained asset exchange credential, service processing can be further performed on the target service. The service blockchain may not need the relevant asset exchange service separately deployed as service support for the target service. It is possible to integrate assets exchange services deployed on the plurality of asset blockchains, to enable the service blockchain to have a variety of asset exchange capabilities, so the construction cost of the service blockchain can be reduced and the service processing process on the service blockchain can be simplified.

Figure 4:
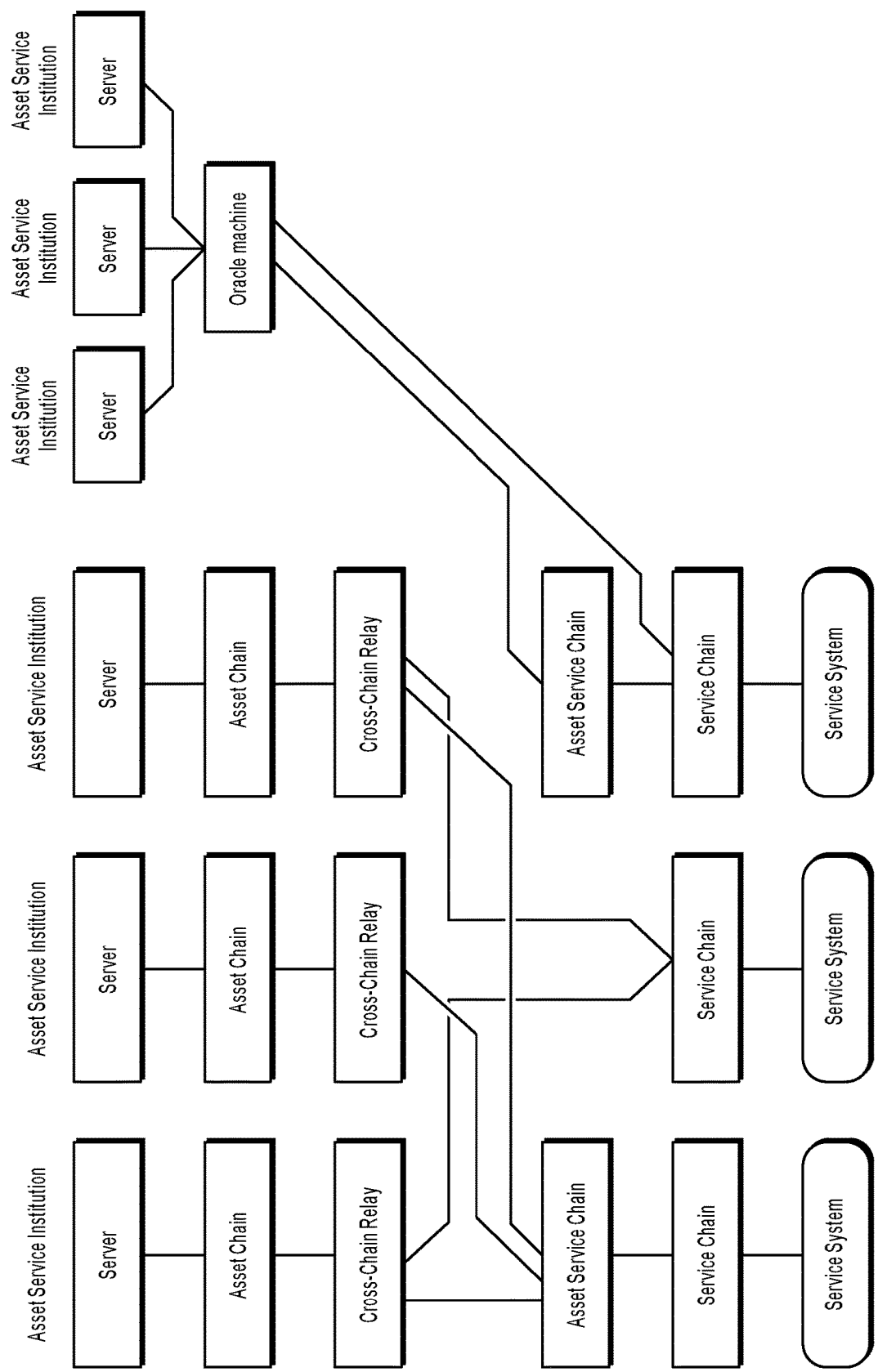
FIG. 4 is an architecture diagram of a cross-chain service system according to an embodiment of the present disclosure.

Referring to FIG. 4, which is an architecture diagram of a cross-chain service system according to an embodiment of the present disclosure.

As shown in FIG. 4, the cross-chain interaction system may be a cross-chain system composed of a plurality of blockchains, and may include the following parts.

Service blockchain (hereinafter referred to as service chain). A service chain can carry various blockchain services, including target services that need asset exchange services of asset service institutions as service support. The cross-chain interaction system may include a plurality of service chains. The types of blockchain services carried by different service blockchains may also be different. Service chain can invoke relevant asset exchange functions on the asset class through the cross-chain relay.

Service system. A service system can be interlinked with the service chain, and use the asset exchange credential stored on the service chain as service support to perform further service processing for the target service. The cross-chain interaction system may also include a plurality of service systems.

Asset blockchain (hereinafter referred to as asset chain). An asset chain can be interlinked with an asset service institution, and convert the real-world physical assets operated by the asset service institution as a value support into virtual assets that can be circulated on the blockchain.

For example, a user can own physical assets operated by an asset service institution. When a user wants to convert owned physical assets into virtual assets that can be circulated on the asset chain, the user can post a transaction for creating virtual assets to the asset blockchain through a client, to trigger the creation of virtual assets on the asset blockchain that match the value of the physical assets the user owns.

Alternatively, the user can also invoke the smart contract for creating virtual assets which is deployed on the asset chain by posting a transaction for invoking a smart contract to the asset blockchain, to trigger the creation of virtual assets on the asset blockchain that match the value of the physical assets the user owns.

Here, the cross-chain interaction system may also include a plurality of asset chains. The types of virtual assets circulating on different asset chains may also be different. The asset service institutions mentioned above may include physical asset centers such as banks and payment institutions.

An asset exchange service can also be deployed on the asset chain, which can provide asset circulation services between blockchain accounts for the blockchain accounts on the asset chain.

For example, in an implementation, the asset circulation services may include a series of service functions such as transfer, freezing, thawing, authorization, and withholding of virtual assets.

The specific manner of deploying the asset exchange service on the asset chain is not specifically limited in the present disclosure.

For example, in one implementation, a new transaction type for asset exchange can be expanded on the asset chain, in which each blockchain account on the asset chain can post an asset exchange transaction on the asset chain, carries the transferor and transferor accounts of the asset exchange in the asset exchange transaction, to further complete the asset exchange between the transferor and transferee accounts.

In an implementation, an asset exchange service can also be deployed in the form of a smart contract on the asset chain. In this case, a smart contract can be deployed on the asset chain and an asset exchange logic (contract codes) used to implement asset exchange can be declared in the smart contract. Each blockchain account on the asset chain can invoke the asset exchange logic declared in the smart contract by posting a transaction for invoking the smart contract on the asset chain and carrying the transferor and transferor accounts of the asset exchange in the asset exchange transaction, to further complete the asset exchange between the transferor and transferee accounts.

Cross-chain relay. A cross-chain relay can be interlinked with the service chain and the asset chain through a bridge interface. Based on the implemented data transport logic, the cross-chain data synchronization between the service chain and the asset chain can be achieved. Here, the cross-chain technology used in the implementation of the cross-chain relay is not specifically limited in the present disclosure. For example, in an implementation, the service chain can be connected to the asset chain through cross-chain mechanisms such as side chain technology and notary technology.

After the service chain and the asset chain are interlinked through the cross-chain relay, the service chain and the asset chain can read and authenticate the data on the other blockchain, and can also invoke a smart contract deployed on the other blockchain. That is, the service chain can invoke the asset exchange service deployed on the interlinked asset chain through the cross-chain relay.

Here, in an implementation, the service chain can be interlinked with a plurality of asset chains through the cross-chain relay, so that the service chain can incorporate asset exchange services on a plurality of asset chains and have asset exchange capabilities for a plurality of assets.

It should be noted that the cross-chain relay is only used to transport data between the service chain and the asset chain. It may not store the transported data persistently, nor may it maintain the data state of the transported data. In an implementation, a cross-chain relay can be configured on devices, nodes, or platforms that are independent of the service chain and asset chain, or on node devices on the service chain or asset chain, which is not specifically limited in the present disclosure.

As shown in FIG. 4, in addition to interlinking with the asset chain through the cross-chain relay, the service chain can also be interlinked with a server of each asset service institution through an Oracle machine.

Here, unlike the cross-chain relay, the function of the Oracle machine may not synchronize data on one blockchain to another blockchain, but may synchronize data entities outside the chain (such as a centralized server or data center) to the blockchain. That is, the cross-chain relay is used to connect the two blockchains, and the Oracle machine is used to connect the blockchain with a data entity outside the chain to achieve data interaction between the blockchain and the real world.

The specific implementation of connecting the blockchain and the data entity outside the chain through the Oracle machine are not described in detail in the present disclosure, and those skilled in the art may refer to relevant disclosure in related technologies.

Asset exchange services can also centrally deploy on the server of each asset service institution. Therefore, the service chain can use the Oracle machine to invoke the asset exchange service deployed on the server of the interlinked asset service institution.

Still referring to FIG. 4, in an illustrated implementation, the cross-chain interaction system may further include an asset service chain. The asset service chain is a comprehensive service chain, which can be interlinked respectively with a plurality of asset chains through the cross-chain relay, and then can integrate asset service capabilities of the plurality of asset chains.

Asset exchange services can also be deployed on the asset service chain, providing a series of asset exchange functions for blockchain accounts on the asset service chain. In this case, the service chain can obtain varieties of asset exchange capabilities merely through single-point interlink with the asset service chain through the cross-chain relay, without respectively interlinking a plurality of asset chains through the cross-chain relay.

Still referring to FIG. 4, in addition to interlinking with the asset chain through a cross-chain relay, the asset service chain can also be interlinked to the servers of various asset service institutions through Oracle machines.

In this case, the service chain can also obtain varieties of asset exchange capabilities through a single-point interlink with the asset service chain through the cross-chain relay, without respectively interlinking a plurality of servers of various asset service institutions through Oracle machines.

Figure 5:
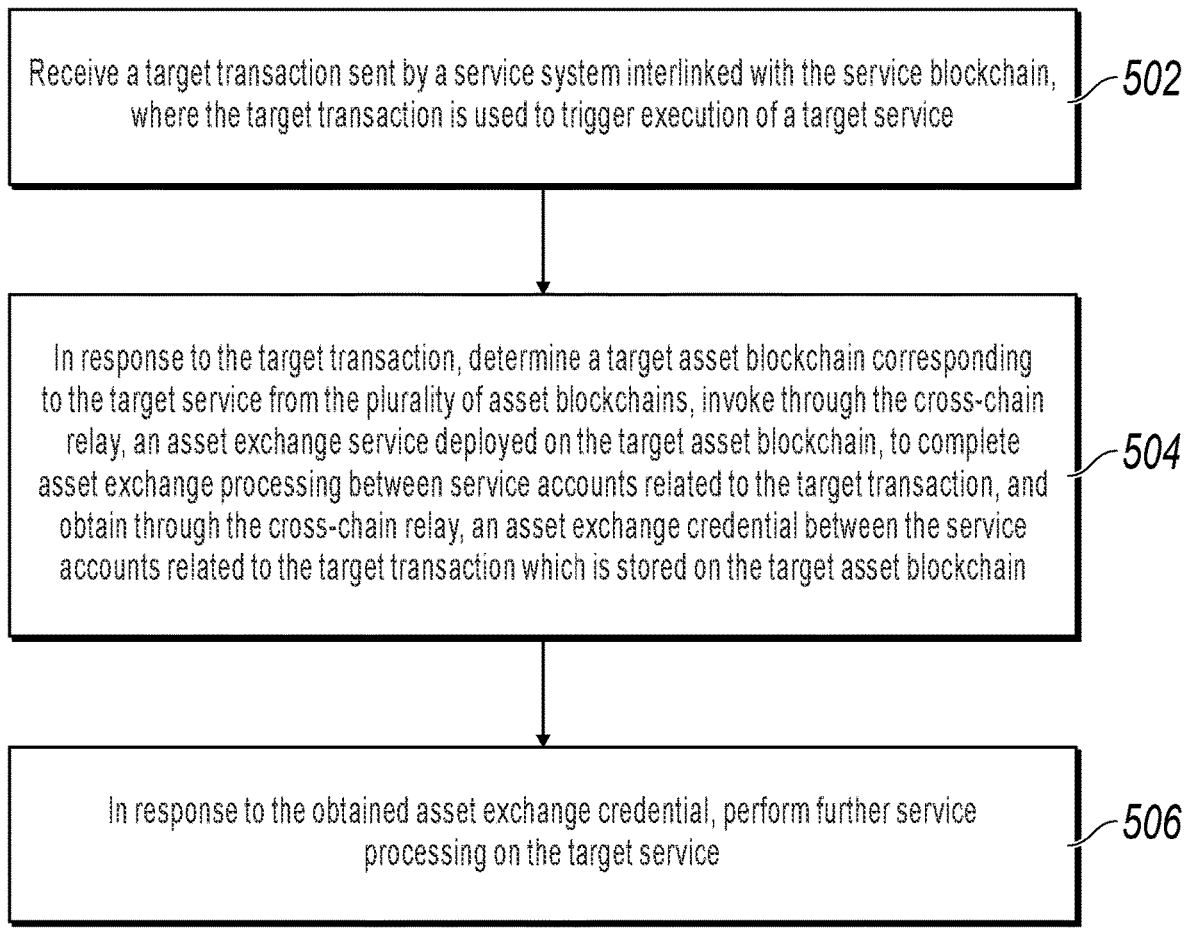
FIG. 5 is a flowchart of a blockchain-based service processing method according to an embodiment of the present disclosure.

Referring to FIG. 5, which is a flowchart of a blockchain-based service processing method according to an embodiment of the present disclosure. The method can be applied to a node device in a service blockchain in the cross-chain service system shown in FIG. 4. The method includes the following steps.

At step 502, a target transaction sent by a service system interlinked with the service blockchain is received, where the target transaction is used to trigger execution of a target service.

At step 504, in response to the target transaction, a target asset blockchain corresponding to the target service is determined from a plurality of asset blockchains. Through a cross-chain relay, an asset exchange service deployed on the target asset blockchain is invoked, to complete asset exchange processing between service accounts related to the target transaction. An asset exchange credential between the service accounts related to the target transaction which is stored on the target asset blockchain is obtained through the cross-chain relay.

At step 506, in response to the obtained asset exchange credential, further service processing is performed on the target service.

In some embodiments of the present disclosure, the target service may refer to the service that requires the asset exchange service as a service support. When the service system executes the above target service on the interlinked service chain, it is possible to invoke across chains, through the cross-chain relay, the asset exchange service deployed on the asset chain interlinked with the service chain, to complete the asset exchange processing between service accounts related to the target transaction. An asset exchange credential between the service accounts related to the target transaction can be obtained through the cross chain relay. Then, further service processing on the target service can be performed based on the obtained asset exchange credential.

In an illustrated implementation, a first smart contract corresponding to the target service may be deployed on the service chain, so that a service system interlinked to the service chain can invoke the first smart contract by posting a transaction, and execute the target service on the service chain.

A cross-chain processing logic and a service processing logic can be declared in the contract codes of the first smart contract in advance. The cross-chain processing logic is used to determine the target asset blockchain corresponding to the target service from the plurality of asset blockchains interlinked with the service chain. The cross-chain processing logic can further invoke an asset exchange service deployed on the target asset blockchain through the cross chain relay, to complete asset exchange processing between service accounts related to the target transaction, and obtain through the cross-chain relay, an asset exchange credential generated after the asset exchange. Then, based on the obtained asset exchange credential, the cross-chain processing logic can perform further service processing on the target service.

In this case, when the service system executes the target service on the interlinked service chain, the service system can post a target transaction to the service chain for invoking the first smart contract. Upon receiving the target transaction, the node device in the service chain can perform consensus processing on the target transaction with other node devices. After reaching a consensus, the node device, serving as the record keeping node in the service chain, package the target transaction and other transaction into a block, and persistently store the credential in the blockchain. Here, the consensus process of the target transaction will not be described in the present disclosure.

For the target transaction packaged into the block, the node devices in the blockchain can execute the target transaction, and execute in the local EVM the cross-chain processing logic which is declared in the contract codes of the first smart contract and invoked by the target transaction, to determine the target asset chain corresponding to the target service from the plurality of asset blockchains. For example, in an implementation, the target asset chain corresponding to the target service can be determined based on an asset exchange type actually required by the target service.

After the target asset chain corresponding to the target service is determined, the asset exchange service deployed on the target asset chain can be invoked through the cross-chain relay to complete the asset exchange processing between the service accounts related to the target transaction.

For example, taking the above target service as a real estate trading service as an example, the service accounts related to the target service can refer to the buyer's property account and the seller's property account, and the above asset exchange service can refer to the "real estate ownership transfer" service. Correspondingly, the above asset exchange processing refers to the completion of the "real estate ownership transfer" between the buyer's property account and the seller's property account based on the "real estate ownership transfer" service provided by a real estate trading service institution.

In an illustrated implementation, the asset exchange service may be deployed on the target asset chain in the form of a smart contract. A second smart contract corresponding to the asset exchange service may be deployed on the asset chain, and an asset exchange service logic may be declared in the contract codes of the second smart contract.

In this case, after the target asset chain corresponding to the target service is determined by executing the cross-chain processing logic declared in the contract codes of the first smart contract, the asset exchange service logic declared in the contract codes of the second smart contract can be further invoked through the cross-chain relay, to complete the asset exchange processing between the service accounts related to the target transaction.

That is, the first smart contract deployed in the service chain, through the cross-chain relay, further invokes the second smart contract deployed on the target asset chain to implement cross-chain invoke between smart contracts.

After the second smart contract completes the asset exchange processing, the asset exchange credential between the service accounts related to the target transaction is posted to the target asset chain for storage. The first smart contract can further obtain the asset exchange credential posted by the second smart contract to the target asset chain through the cross-chain relay.

After the first smart contract obtains the asset exchange credential posted by the second smart contract to the target asset chain, in response to the obtained asset exchange credential, the service processing logic declared in the contract codes of the first smart contract may be further invoked to perform further service processing on the target service, and post the service processing result to the service chain for storage.

For example, still taking the target service being the real estate trading service as an example, the asset exchange credential refers to a "real estate ownership transfer" credential generated after "real estate ownership transfer" is completed for the house between the buyer's property account and the seller's property account, based on the "real estate ownership transfer" service provided by the real estate service institution. The further service processing performed for the target service may refer to subsequent service processing (such as the payment for the house, etc.) of the real estate trading service further completed based on the "real estate ownership transfer" credential.

In another illustrated implementation, further service processing for the target service may also be performed by a service system that is interlinked with the service chain, instead of being performed on the service chain through the first smart contract.

In this case, the contract codes of the first smart contract may declare the cross-chain processing logic, and may not declare the service processing logic. Or, in another case, the service chain may not deploy the first smart contract any more. That is, the cross-chain processing logic declared in the contract codes of the first smart contract described above can be implemented locally on the node device on the service chain, and is not implemented through smart contracts.

After the service chain obtains the asset exchange credential through the cross-chain relay, the asset exchange credential can be posted to the service chain for storage. For the above service system, it is possible to monitor the data stored in the service chain by implementing a monitoring program. Once the asset exchange credential is monitored, in response to the asset exchange credential, further service processing may be executed for the target service in the service system.

In the above technical solution, the service blockchain can be interlinked with a plurality of asset blockchains through a cross-chain relay. As such, when a service system interlinked with the service blockchain executes a target service which needs an asset exchange service deployed on a target asset blockchain as service support, an asset exchange credential between service accounts related to the target transaction which is stored on the target asset blockchain can be obtained through the cross-chain relay. Then, based on the obtained asset exchange credential, service processing can be further performed on the target service. The service blockchain may not need the relevant asset exchange service separately deployed as service support for the target service. It is possible to integrate assets exchange services deployed on the plurality of asset blockchains, to enable the service blockchain to have a variety of asset exchange capabilities, so the construction cost of the service blockchain can be reduced and the service processing process on the service blockchain can be simplified.

Figure 6:
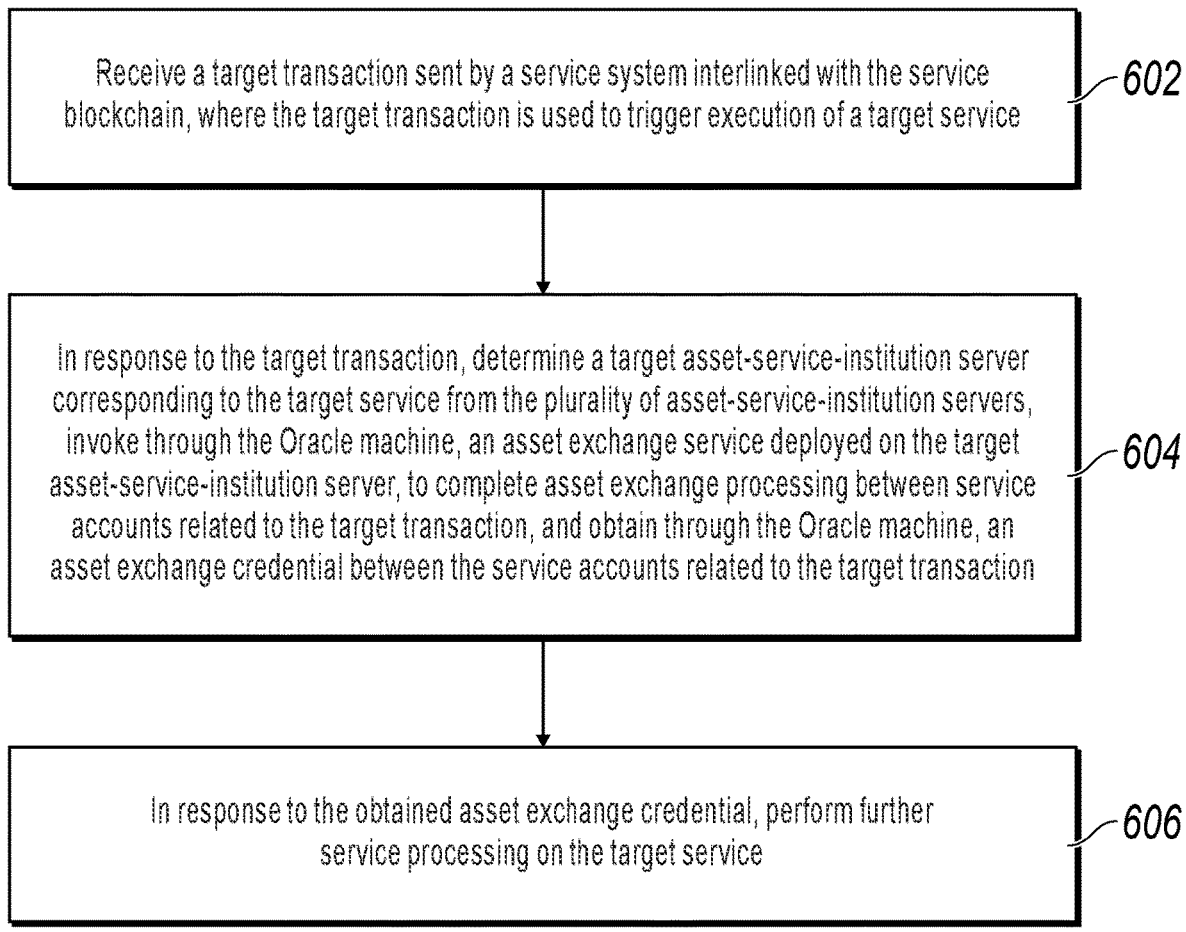
FIG. 6 is a flowchart of another blockchain-based service processing method according to an embodiment of the present disclosure.

Referring to FIG. 6, which is a flowchart of a blockchain-based service processing method according to an embodiment of the present disclosure. This method can also be applied to a node device in a service blockchain in the cross-chain service system shown in FIG. 4. The method includes the following steps.

At step 602, a target transaction sent by a service system interlinked with the service blockchain is received, where the target transaction is used to trigger execution of a target service.

At step 604, in response to the target transaction, a target asset-service-institution server corresponding to the target service is determined from a plurality of asset-service-institution servers. Through an Oracle machine, an asset exchange service deployed on the target asset-service-institution server is invoked, to complete asset exchange processing between service accounts related to the target transaction. An asset exchange credential between the service accounts related to the target transaction is obtained through the Oracle machine.

At step 606, in response to the obtained asset exchange credential, further service processing is performed on the target service.

In some embodiments of the present disclosure, when the service system executes the above target service on the interlinked service chain, instead of invoking across chains, through the cross-chain relay, the asset exchange service deployed on the asset chain interlinked with the service chain, to complete the asset exchange processing between service accounts related to the target transaction, it is also possible to invoke through an Oracle machine, the asset exchange service deployed on the server of the asset service institution which is interlinked with the service chain, to complete the asset exchange processing between service accounts related to the target transaction, obtain through the Oracle machine an asset exchange credential between the service accounts related to the target transaction, and then perform further service processing on the target service based on the obtained asset exchange credential.

In an illustrated implementation, a third smart contract corresponding to the target service may be deployed on the service chain, so that a service system interlinked to the service chain can invoke the third smart contract by posting a transaction, and execute the target service on the service chain.

A cross-chain processing logic and a service processing logic can be declared in the contract codes of the third smart contract in advance. The cross-chain processing logic is used to determine the target asset-service-institution server corresponding to the target service from the plurality of asset-service-institution servers interlinked with the service chain. The cross-chain processing logic is further used to invoke an asset exchange service deployed on the target asset-service-institution server, to complete asset exchange processing between service accounts related to the target transaction. The cross-chain processing logic is further used to obtain through the Oracle machine an asset exchange credential generated after the asset exchange, and then based on the obtained asset exchange credential, perform further service processing on the target service.

In this case, when the service system executes the target service on the interlinked service chain, the service system can post a target transaction to the service chain for invoking the third smart contract. Upon receiving the target transaction, the node device in the service chain can perform consensus processing on the target transaction with other node devices. After reaching a consensus, the node device, serving as the record keeping node in the service chain, package the target transaction and other transaction into a block, and persistently store the credential in the blockchain. Here, the consensus process of the target transaction will not be described in the present disclosure.

For the target transaction packaged into the block, all of the node devices in the blockchain can execute the target transaction, and execute in the local EVM the cross-chain processing logic which is declared in the contract codes of the third smart contract and invoked by the target transaction, to determine the target asset-service-institution server corresponding to the target service from the plurality of target asset-service-institution servers. For example, in an implementation, the target asset-service-institution server corresponding to the target service can be determined based on an asset exchange type actually required by the target service.

After the target asset-service-institution server corresponding to the target service is determined, the asset exchange service deployed on the target asset-service-institution server can be invoked through the Oracle machine to complete the asset exchange processing between the service accounts related to the target transaction.

After target asset-service-institution server completes the asset exchange processing, the third smart contract can obtain through the Oracle machine the asset exchange credential generated after the asset exchange processing is completed by the target asset-service-institution server.

After the third smart contract obtains the asset exchange credential, in response to the obtained asset exchange credential, the service processing logic declared in the contract codes of the third smart contract may be further invoked to perform further service processing on the target service, and post the service processing result to the service chain for storage.

In another illustrated implementation, further service processing for the target service may also be performed by a service system that is interlinked with the service chain, instead of being performed on the service chain through the third smart contract.

In this case, the contract codes of the third smart contract may only declare the cross-chain processing logic, and may not declare the service processing logic. Or, in another case, the service chain may not deploy the third smart contract any more. That is, the cross-chain processing logic declared in the contract codes of the third smart contract described above can be implemented locally on the node device on the service chain, and is not implemented through smart contracts.

After the service chain obtains the asset exchange credential through the cross-chain relay, the asset exchange credential can be posted to the service chain for storage. For the above service system, it is possible to monitor the data stored in the service chain by implementing a monitoring program. Once the asset exchange credential is monitored, in response to the asset exchange credential, further service processing may be executed for the target service in the service system.

In the above technical solution, the service blockchain can also be interlinked with a plurality of servers of asset service institutions through an Oracle machine. As such, when a service system interlinked with the service blockchain executes a target service which needs an asset exchange service deployed on a target asset-service-institution server as service support, an asset exchange service deployed on the target asset-service-institution server can be invoked through the Oracle machine, to execute the asset exchange processing between the service accounts related to the target transaction, and the asset exchange credential between the service accounts related to the target transaction can be obtained through the Oracle machine. Then, based on the obtained asset exchange credential, service processing can be further performed on the target service. The service blockchain may not need the relevant asset exchange service separately deployed as service support for the target service. It is possible to integrate assets exchange services deployed on the plurality of servers of asset service institutions, to enable the service blockchain to have a variety of asset exchange capabilities, so the construction cost of the service blockchain can be reduced and the service processing process on the service blockchain can be simplified.

Corresponding to the above method embodiment, this application also provides an embodiment of an apparatus.

Corresponding to the above method embodiment, the present disclosure also provides an embodiment of a blockchain-based service processing apparatus. The embodiment of the blockchain-based service processing apparatus of the present disclosure can be applied to an electronic device. The apparatus embodiment can be implemented by software, or by hardware or a combination of software and hardware. Taking software implementation as an example, as an apparatus in a logical sense, it is formed by reading the corresponding computer program instructions in the non-volatile memory into the memory through the processor of the electronic device where it is located. In terms of hardware, as shown in FIG. 7, which is a hardware structure diagram of the electronic device where the blockchain-based service processing apparatus of the present disclosure is located, in addition to the processor, the memory, the network interface, and the non-volatile memory shown in FIG. 7, the electronic device in which the apparatus is located in the embodiment may generally include other hardware according to the actual function of the electronic device, details of which will not be described herein.

Figure 8:
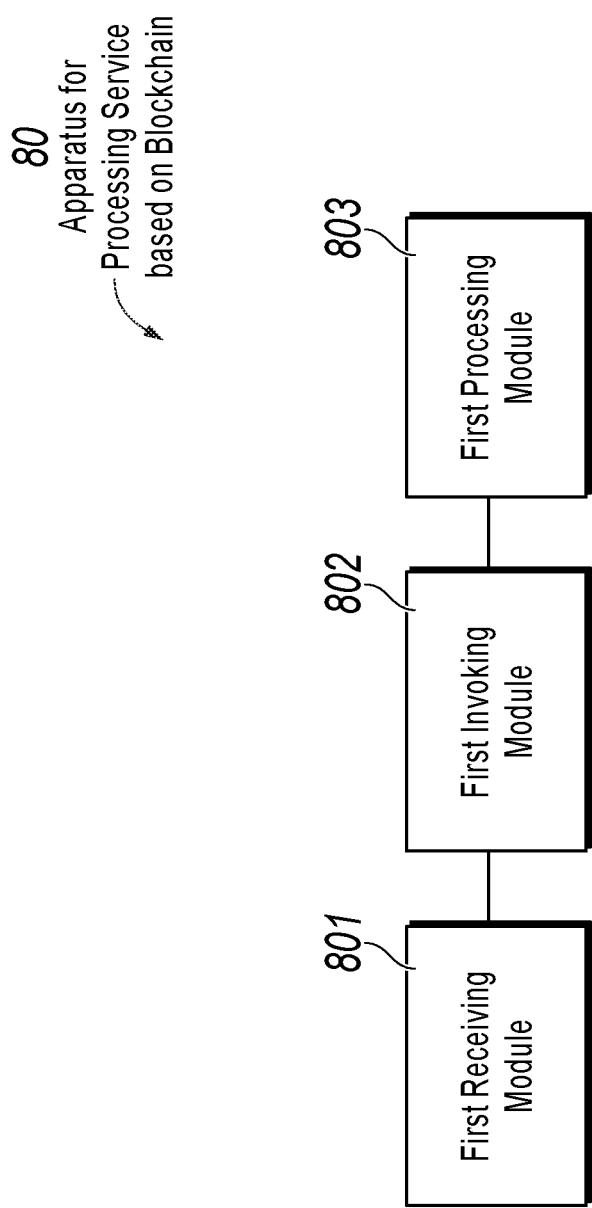
FIG. 8 is a block diagram of a blockchain-based service processing apparatus according to an embodiment of the present disclosure.

FIG. 8 is a block diagram of a blockchain-based service processing apparatus according to an embodiment of the present disclosure.

Figure 7:
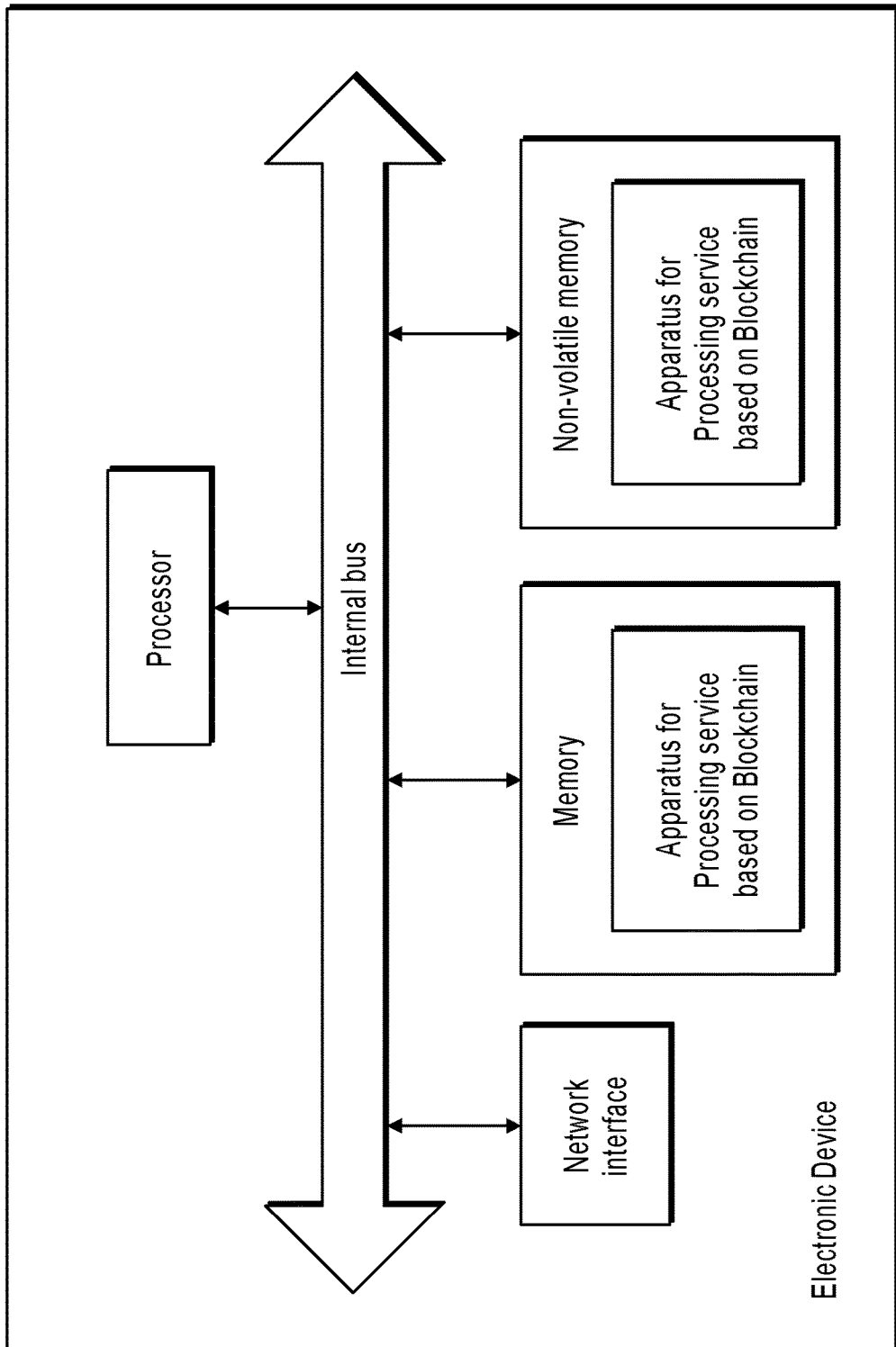
FIG. 7 is a schematic structural diagram of an electronic device according to an embodiment of the present disclosure.

Referring to FIG. 8, the blockchain-based service processing apparatus 80 may be applied to the electronic device shown in FIG. 7, which is used as a node device in a service blockchain in a cross-chain service system. The cross-chain service system includes a service blockchain, and a plurality of asset blockchains interlinked with the service blockchain through a cross-chain relay. An asset exchange service is deployed on the asset blockchain. One example of the apparatus includes: a first receiving module 801 configured to receive a target transaction sent by a service system interlinked with the service blockchain, where the target transaction is used to trigger execution of a target service; a first invoking module 802 configured to, in response to the target transaction, determine a target asset blockchain corresponding to the target service from the plurality of asset blockchains, invoke through the cross-chain relay, an asset exchange service deployed on the target asset blockchain, to complete asset exchange processing between service accounts related to the target transaction, and obtain through the cross-chain relay, an asset exchange credential between the service accounts related to the target transaction which is stored on the target asset blockchain; and a first processing module 803 configured to, in response to the obtained asset exchange credential, perform further service processing on the target service.

In some embodiments, the first invoking module 802 is further configured to: in response to the target transaction, invoke a cross-chain processing logic in a first smart contract deployed on the service blockchain, determine a target asset blockchain corresponding to the target service from the plurality of asset blockchains, invoke through the cross-chain relay, an asset exchange service deployed on the target asset blockchain, to complete asset exchange processing between service accounts related to the target transaction, and obtain through the cross-chain relay, an asset exchange credential between the service accounts related to the target transaction which is stored on the target asset blockchain.

In some embodiments, the first invoking module 802 is further configured to: invoke through the cross-chain relay, an asset exchange service logic in a second smart contract deployed on the target asset blockchain, to complete asset exchange processing between service accounts related to the target transaction, and obtain through the cross-chain relay, the asset exchange credential posted by the second smart contract to the target asset blockchain for storage after the asset exchange processing is completed.

In some embodiments, the first processing module 803 is further configured to: in response to the obtained asset exchange credential, further invoke a service processing logic in the first smart contract to perform further service processing on the target service, and post a service processing result to the service chain for storage.

In some embodiments, the first processing module 803 is further configured to: in response to the obtained asset exchange credential, post the asset exchange credential to the service blockchain for storage, so that upon monitoring the asset exchange credential, the service system performs further service processing on the target service, and posts a service processing result to the service blockchain for storage.

In some embodiments, the service blockchain is interlinked with an asset service chain through the cross-chain relay. The asset service chain is further interlinked with the plurality of asset blockchains through the cross-chain relay respectively. Or, the asset service chain is further interlinked with a server of an asset service institution through an Oracle machine.

In some embodiments, the service blockchain is interlinked with the server of the asset service institution through the Oracle machine. The server of the asset service institution deploys an asset exchange service.

Figure 9:
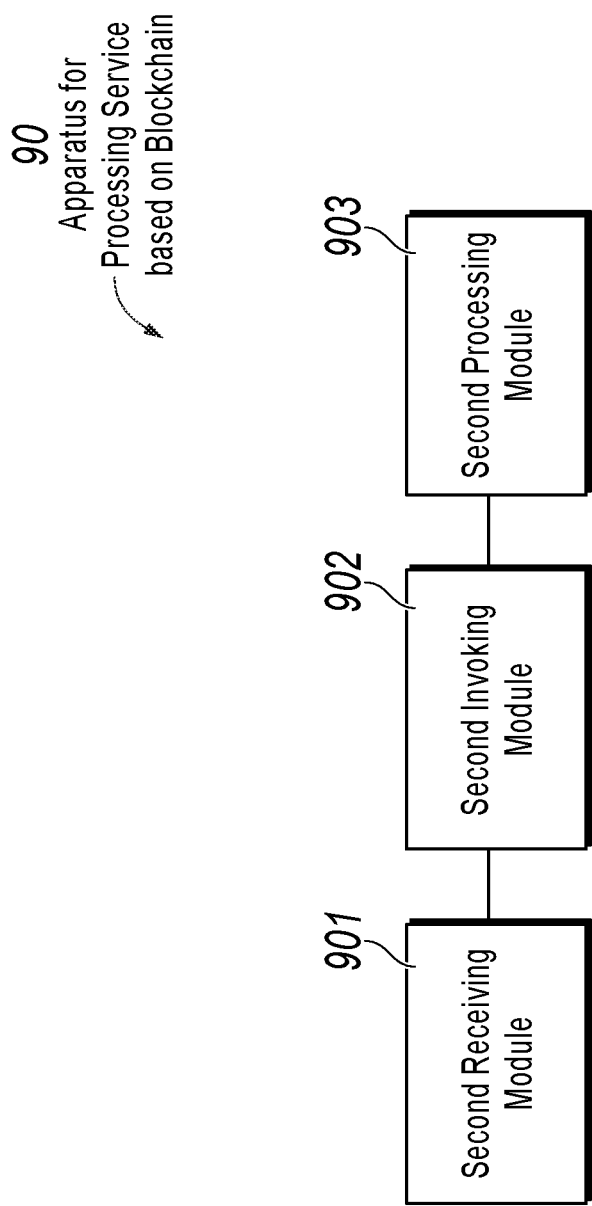
FIG. 9 is a block diagram of another blockchain-based service processing apparatus according to an embodiment of the present disclosure.

FIG. 9 is a block diagram of another blockchain-based service processing apparatus according to an embodiment of the present disclosure.

Referring to FIG. 9, the blockchain-based service processing apparatus 90 may also be applied to the electronic device shown in FIG. 7 described above, and the electronic device serves as a node device in a service blockchain in a cross-chain service system. The cross-chain service system includes a service blockchain, and servers of a plurality of asset service institutions which are interlinked with the service blockchain through an Oracle machine. An asset exchange service is deployed on the server. One example of the apparatus includes: a second receiving module 901 configured to receive a target transaction sent by a service system interlinked with the service blockchain, where the target transaction is used to trigger execution of a target service; a second invoking module 902 configured to, in response to the target transaction, determine a target asset-service-institution server corresponding to the target service from the plurality of asset-service-institution servers, invoke through the Oracle machine, an asset exchange service deployed on the target asset-service-institution server, to complete asset exchange processing between service accounts related to the target transaction, and obtain through the Oracle machine, an asset exchange credential between the service accounts related to the target transaction; and a second processing module 903 configured to, in response to the obtained asset exchange credential, perform further service processing on the target service.

In some embodiments, the second invoking module 902 is further configured to: in response to the target transaction, invoke a cross-chain processing logic in a third smart contract deployed on the service blockchain, determine a target asset-service-institution server corresponding to the target service from the plurality of asset-service-institution servers, and invoke through the Oracle machine, an asset exchange service deployed on the target asset-service-institution server, to complete asset exchange processing between service accounts related to the target transaction.

In some embodiments, the second processing module 903 is further configured to: in response to the obtained asset exchange credential, further invoke a service processing logic in the third smart contract to perform further service processing on the target service, and post a service processing result to the service blockchain for storage.

In some embodiments, the second processing module 903 is further configured to: in response to the obtained asset exchange credential, post the asset exchange credential to the service blockchain for storage, so that upon monitoring the asset exchange credential, the service system performs further service processing on the target service, and posts a service processing result to the service blockchain for storage.

In some embodiments, the service blockchain is interlinked with the asset service chain through a cross-chain relay; wherein the asset service chain is further interlinked with the servers of the plurality of asset service institutions respectively through an Oracle machine.

The system, apparatus, module, or unit described in the foregoing embodiments may be implemented by a computer chip or entity, or a product with a certain function. A typical implementation device is a computer, and the specific form of the computer may be a personal computer, a laptop computer, a cellular phone, a camera phone, a smart phone, a personal digital assistant, a media player, a navigation device, an email sending and receiving device, and a game console, a tablet computer, a wearable device, or a combination of any of these devices.

In a configuration, a computer includes one or more processors (CPUs), an input/output interface, a network interface, and a memory.

The memory may include a transitory memory, a random access memory (RAM), and/or a non-volatile memory in a computer-readable medium, such as a read-only memory (ROM) or a flash RAM. The memory is an example of a computer-readable medium.

The computer-readable medium includes either permanent or non-permanent, either removable or non-removable medium, which can store information by any method or technology. Information may be computer-readable instructions, data structures, modules of a program, or other data. Examples of computer storage media include, but are not limited to, a phase change memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a read-only disc, a read-only memory (CD-ROM), a digital versatile disc (DVD) or other optical storage, a magnetic tape cartridge, magnetic disk storage, a quantum memory, graphene-based storage media, or other magnetic storage devices or any other non-transmission media can be used to store information that can be accessed by computing devices. As defined herein, computer-readable media does not include temporary computer-readable media (transitory media), such as modulated data signals and carrier waves.

It should also be noted that the terms "including", "comprising" or any other variation thereof are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including a . . . " do not exclude the existence of other identical elements in the process, method, product or device including the elements.

The embodiments of the present disclosure have been described above. Other embodiments are within the scope of the following claims. In some cases, the actions or steps recited in the claims may be performed in a different order than in the embodiments and the desired result may still be achieved. In addition, the processes depicted in the figures may not require the particular order shown or sequential order to achieve the desired results. In some embodiments, multitasking and parallel processing are also possible or may be advantageous.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

The above descriptions are merely some embodiments of the present disclosure, and are not intended to limit one or more embodiments of the present disclosure. Wherever within the spirit and principle of one or more embodiments of the present disclosure, any modification, equivalent replacement, improvement, etc. should be included in the protection scope of one or more embodiments of the present disclosure.

What is claimed is:

1. A computer-implemented method comprising:
    receiving a target transaction, by a node device in a service blockchain and from a service system interlinked with the service blockchain, wherein the service blockchain is interlinked with an asset service blockchain so that the service blockchain and the asset service blockchain can read and authenticate data from each other, and the asset service blockchain is further interlinked with a plurality of asset-service-institution servers through a blockchain oracle;
    based on receiving the target transaction, (i) triggering execution of a target service and (ii) determining a target asset-service-institution server corresponding to the target service from the plurality of asset-service-institution servers;
    invoking, by the node device and through the blockchain oracle, an asset exchange service deployed on the target asset-service-institution server, to complete asset exchange processing between service accounts related to the target transaction; and
    obtaining, by the node device and through the blockchain oracle, an asset exchange credential between the service accounts related to the target transaction.

2. The computer-implemented method of claim 1, comprising
    based on receiving the target transaction:
        invoking a cross-chain processing logic in a smart contract deployed on the service blockchain; and invoking, through the blockchain oracle, the asset exchange service deployed on the target asset-service-institution server, to complete asset exchange processing between the service accounts related to the target transaction.

3. The computer-implemented method of claim 1, comprising:
after obtaining the asset exchange credential, performing further transaction processing on the target service.

4. The computer-implemented method of claim 3, wherein performing further transaction processing on the target service comprises:
invoking a transaction processing logic in a smart contract deployed on the service blockchain; and
posting a transaction processing result to the service blockchain for storage.

5. The computer-implemented method of claim 3, wherein performing further transaction processing on the target service comprises:
posting the asset exchange credential to the service blockchain for storage; and
upon determining that the asset exchange credential has been posted to the service blockchain for storage, posting a transaction processing result to the service blockchain for storage.

6. The computer-implemented method of claim 1, wherein the service blockchain is interlinked with the asset service blockchain through a cross-chain relay.

7. A computer-implemented system, comprising
one or more computers, and
one or more computer memory devices interoperably coupled with the one or more computers and having tangible, non-transitory, machine-readable media storing one or more instructions that, when executed by the one or more computers, cause the one or more computers to perform operations comprising:
receiving a target transaction, by a node device in a service blockchain and from a service system interlinked with the service blockchain, wherein the service blockchain is interlinked with an asset service blockchain so that the service blockchain and the asset service blockchain can read and authenticate data from each other, and the asset service blockchain is further interlinked with a plurality of asset-service-institution servers through a blockchain oracle;
based on receiving the target transaction, (i) triggering execution of a target service and (ii) determining a target asset-service-institution server corresponding to the target service from the plurality of asset-service-institution servers;
invoking, by the node device and through the blockchain oracle, an asset exchange service deployed on the target asset-service-institution server, to complete asset exchange processing between service accounts related to the target transaction; and
obtaining, by the node device and through the blockchain oracle, an asset exchange credential between the service accounts related to the target transaction.

8. The computer-implemented system of claim 7, the operations comprising
based on receiving the target transaction:
invoking a cross-chain processing logic in a smart contract deployed on the service blockchain; and
invoking, through the blockchain oracle, the asset exchange service deployed on the target asset-service-institution server, to complete asset exchange processing between the service accounts related to the target transaction.

9. The computer-implemented system of claim 7, the operations comprising:
after obtaining the asset exchange credential, performing further transaction processing on the target service.

10. The computer-implemented system of claim 9, wherein performing further transaction processing on the target service comprises:
invoking a transaction processing logic in a smart contract deployed on the service blockchain; and
posting a transaction processing result to the service blockchain for storage.

11. The computer-implemented system of claim 9, wherein performing further transaction processing on the target service comprises:
posting the asset exchange credential to the service blockchain for storage; and
upon determining that the asset exchange credential has been posted to the service blockchain for storage, posting a transaction processing result to the service blockchain for storage.

12. The computer-implemented system of claim 7, wherein the service blockchain is interlinked with the asset service blockchain through a cross-chain relay.

13. A non-transitory, computer-readable medium storing one or more instructions that, when executed by a computer system, cause the computer system to perform operations comprising:
receiving a target transaction, by a node device in a service blockchain and from a service system interlinked with the service blockchain, wherein the service blockchain is interlinked with an asset service blockchain so that the service blockchain and the asset service blockchain can read and authenticate data from each other, and the asset service blockchain is further interlinked with a plurality of asset-service-institution servers through a blockchain oracle;
based on receiving the target transaction, (i) triggering execution of a target service and (ii) determining a target asset-service-institution server corresponding to the target service from the plurality of asset-service-institution servers;
invoking, by the node device and through the blockchain oracle, an asset exchange service deployed on the target asset-service-institution server, to complete asset exchange processing between service accounts related to the target transaction; and
obtaining, by the node device and through the blockchain oracle, an asset exchange credential between the service accounts related to the target transaction.

14. The computer-readable medium of claim 13, the operations comprising
based on receiving the target transaction:
invoking a cross-chain processing logic in a smart contract deployed on the service blockchain; and
invoking, through the blockchain oracle, the asset exchange service deployed on the target asset-service-institution server, to complete asset exchange processing between the service accounts related to the target transaction.

15. The computer-readable medium of claim 13, the operations comprising:
after obtaining the asset exchange credential, performing further transaction processing on the target service.

16. The computer-readable medium of claim 15, wherein performing further transaction processing on the target service comprises:
  invoking a transaction processing logic in a smart contract deployed on the service blockchain; and
  posting a transaction processing result to the service blockchain for storage.

17. The computer-readable medium of claim 15, wherein performing further transaction processing on the target service comprises:
  posting the asset exchange credential to the service blockchain for storage; and
  upon determining that the asset exchange credential has been posted to the service blockchain for storage, posting a transaction processing result to the service blockchain for storage.

18. The computer-readable medium of claim 13, wherein the service blockchain is interlinked with the asset service blockchain through a cross-chain relay.

* * * * *